US007012217B2

(12) United States Patent
Titze et al.

(10) Patent No.: US 7,012,217 B2
(45) Date of Patent: Mar. 14, 2006

(54) METHOD AND APPARATUS FOR MAKING WELDED LARGE PIPES

(75) Inventors: Eberhard Titze, Muldenstein (DE); Klaus Werner, Muldenstein (DE); Steffen Keitel, Halle (DE)

(73) Assignee: Mannesmannröhren-Werke AG, Mülheim (DE)

( * ) Notice: Subject to any disclaimer, the term of this patent is extended or adjusted under 35 U.S.C. 154(b) by 0 days.

(21) Appl. No.: 10/884,875

(22) Filed: Jul. 2, 2004

(65) Prior Publication Data

US 2005/0035094 A1  Feb. 17, 2005

(30) Foreign Application Priority Data

Jul. 3, 2003  (DE) ................................ 103 31 000

(51) Int. Cl.
*B23K 26/00*  (2006.01)
(52) U.S. Cl. .......................... 219/121.64; 219/121.63; 219/121.65; 219/121.66
(58) Field of Classification Search ........... 219/121.64, 219/121.63, 121.65, 121.66, 121.6, 121.85
See application file for complete search history.

(56) References Cited

U.S. PATENT DOCUMENTS

| 2,280,564 | A | * | 4/1942 | Wilson ........................ 72/133 |
| 2,729,180 | A | * | 1/1956 | Freeze ........................ 72/145 |
| 3,263,321 | A | * | 8/1966 | Lombardi .................... 29/429 |
| 3,483,352 | A | * | 12/1969 | Schollhammer ....... 219/121.13 |
| 3,540,267 | A | * | 11/1970 | Wood ........................... 73/622 |
| 4,476,703 | A | * | 10/1984 | Williamson ................... 72/130 |
| 4,527,033 | A | * | 7/1985 | Matsuyama et al. .......... 219/61 |
| 4,578,971 | A | * | 4/1986 | Leweke et al. .............. 72/10.1 |
| 6,417,488 | B1 | * | 7/2002 | Takeuchi et al. ....... 219/130.01 |

FOREIGN PATENT DOCUMENTS

DE  197 58 001 C2  11/1998

OTHER PUBLICATIONS

Stahlrohr Handbuch (*Steel Pipe Handbook*) published by Vulkan-Verlag, Essen, Germany, 12$^{th}$ edition 1995, pp. 143-152.

* cited by examiner

*Primary Examiner*—M. Alexandra Elve
(74) *Attorney, Agent, or Firm*—Henry M. Feiereisen

(57) ABSTRACT

In a method and apparatus for making welded large pipes, a leading end of a hot strip is connected to a trailing end of a leader strip and then subjected to a two-stage leveling for strip flatness in transverse direction and strip flatness in longitudinal direction. The entire surface of the hot strip including strip edges thereof is inspected by ultrasound and the strip edges are prepared in four stages before being pre-bent. The hot strip is then shaped into a slotted tube and the strip edges are welded along the inner and outer sides by laser to produce the pipe. Online process diagnostic is provided for monitoring the welding step and the finished welded pipe diameter is measured through online measurement. Online determination of a profile of a welded seam configuration and computer tomographic determination and evaluation of flaws inside the pipe, as well as ultrasonic inspection of the welded seam are further provided.

24 Claims, 3 Drawing Sheets

METHOD AND APPARATUS FOR MAKING WELDED LARGE PIPES

CROSS-REFERENCES TO RELATED APPLICATIONS

This application claims the priority of German Patent Application, Ser. No. 103 31 000.2, filed Jul. 3, 2003, pursuant to 35 U.S.C. 119(a)–(d), the disclosure of which is incorporated herein by reference.

BACKGROUND OF THE INVENTION

The present invention relates to a method and apparatus for making welded large pipes, in particular helical-seam pipes, from hot strip of steel.

Welded large pipes involved here include longitudinally welded pipes or helical-seam pipes, whereby helical-seam pipes are made at a diameter range of about 400 mm to 3050 mm and at wall thicknesses of 5 mm to 30 mm, and involve pipes which are continuously shaped into helical pipes with constant radius of curvature from a hot strip or sheet metal in a shaping device, whereby converging edges of the strip are welded together. Unlike a manufacture of longitudinally welded pipes which require a particular sheet metal width for each pipe diameter, helical-seam pipes can be made with different pipe diameter from a strip or sheet metal width. The infeed angle of the strip into a shaping unit can hereby be changed whereby a decrease in the infeed angle (at constant strip width) is accompanied by an increase of the pipe diameter.

Projects involving large pipelines, in particular water mains, will be increasingly located in regions that have a high growth in population. Oftentimes, these regions are characterized by a shortness of water and underdeveloped infrastructure. As a result, transport of pipes and logistics becomes time-consuming and costly. In addition, the economy of countries in such regions is frequently precarious and foreign currencies are scarce so that attempts are underway to avoid import of goods and to increase own efforts to satisfy the demand. In order to produce helical-seam pipes, these countries are therefore increasingly involved in the establishment of domestic production sites that can be quickly set up and operated. These types of plants are typically devised to meet a single purpose.

The publication Stahlrohr Handbuch (*Steel Pipe Handbook*) published by Vulkan-Verlag, Essen, Germany, 12$^{th}$ edition 1995, pp. 143–152, describes a method and apparatus for making welded helical-seam pipes, with the apparatus including a stationary unit for producing submerged-arc welded helical-seam pipes. The stationary unit includes a strip shaper, a submerged-arc welder, an ultrasonic inspection of the welded seam and base material before and after welding operation, a cutter for trimming the pipe strand into single pipe sections, and a finishing unit.

Production of a helical-seam pipe involves initially unwinding of a hot strip from a coil and welding of the hot strip, after suitable preparation, to the trailing end of a previously payed-out hot strip to thereby realize a quasi endless strip and thus a continuous pipe welding operation. The strip passes through leveling rollers to level the strip commensurate with the demands on strip flatness. The edges of the strip are trimmed, i.e. the strip is cut to a constant width. At the same time, further tools, such as milling cutter or shearing blades, prepare the edges of the strip to make it fit for subsequent welding operation. Before being shaped into a pipe, the edges are bent to prevent a roof formation in the area of the welded seam.

After shaping into a pipe configuration, submerged-arc welding is applied to connect the converging strip edges on the inside in about 6 o'clock position and, half a turn further, on the outside in 12 o'clock position. As an alternative, pipe shaping may also be combined with tack welding, whereby the tacked pipe is then welded on separate welding stands on the inside and the outside.

Immediately thereafter, the welded seam is inspected by ultrasound for possible flaws, and the pipe strand is cut by a conjointly operating pipe cutter into single pipe sections which are then transferred to a finishing unit to subject the welded helical-seam pipe for visual control to evaluate the pipe condition after production before advance to further processing operations, such as optional finishing works, taking of specimen for destructive inspection, pipe end finishing operation, water pressure sample of the finished pipe, ultrasonic control of the entire welded seam, and X-ray screening of the welded seam if needed.

The process described in Stahlrohr Handbuch requires many inspection and control steps during production of submerged-arc welded helical-seam pipes or longitudinally welded pipe to meet the required quality for the end product. This process is thus time-consuming and unsuitable to satisfy demands for current welding techniques and continuous process control. As this process is intended for a long-term stationary operation, its application is also unsuitable for single-purpose plants which require a quick set up and which can be quickly put into operation.

In summary, the process described in the Stahlrohr Handbuch has the following shortcomings:

very long manufacturing chain with many inspection and control steps, resulting in a very outsized and cost-intensive structure;

transfer of the plant from site to site (mobility) is cost-intensive and time-consuming;

submerged-arc welding results in a relatively large-volume melt bath that makes the use of modern systems for quality assurance difficult;

submerged-arc welding normally requires Y joint or double-Y-joint as edge preparation, accompanied by an increase in welding additives (welding wire and powder) in dependence of the sheet thickness and resulting in larger melt baths, higher risk for flaws, and welding costs;

the size of the melt bath adversely affects, depending on the pipe diameter (curvature of the pipe wall), an increase of the welding speed. This is especially true when thin-walled pipes are involved;

submerged-arc welding results in a significant weld camber at the inner seam and outer seam, thereby adversely affecting a later coating of the inside and outside of the pipe. The weld camber, on one hand, results also in increased wear of the coating material, and, on the other hand, there is a risk of damage to the outer pipe coating in the area of the weld camber during transport and handling.

German Pat. No. DE 197 58 001 C2 describes a method and apparatus for making helical-seam pipes through laser welding, whereby laser welding is applied to configure the seam substantially flat, to provide a fine-grained structure and strength properties of the seam to at least correspond to the strength properties of the base material, and to provide helical-seam pipes in the form of continuous cylindrical pipes. This method is unsuitable to produce a machine-ready high quality pipe by way of a mobile plant design.

It would therefore be desirable and advantageous to provide an improved method and apparatus for making welded large pipes, in particular helical-seam pipes, to obviate prior art shortcomings.

SUMMARY OF THE INVENTION

According to one aspect of the present invention, a method of making a large welded pipe from hot strip of steel includes the steps of unwinding a hot strip, connecting a leading end of the strip with a trailing end of a leader strip, two-stage leveling of the hot strip for strip flatness in transverse direction, leveling the hot strip for strip flatness in longitudinal direction, ultrasonic inspection of an entire surface of the hot strip including inspecting strip edges of the hot strip, four-stage preparation of the strip edges, bending the strip edges, shaping the hot strip into a slotted tube, welding the strip edges along the inside and outside of the slotted tube by laser to thereby form a pipe, online process diagnostics of the welding step, online measurement of a pipe diameter, online determination of a profile of a welded seam configuration, computer tomographic determination and evaluation of flaws inside the pipe, and ultrasonic inspection of the welded seam.

The present invention resolves prior art problems by manufacturing the large pipe or helical-seam pipe through laser welding, and by integrating the process control at the end of the actual production process to make a machine-ready high-quality pipe. As a consequence, the manufacturing chain is significantly shortened and a greatly simplified assembly can be designed that enables concentration of essential components of the manufacturing process, including continuous process control, to the actual welding device. Suitably, the plant design is realized as modular system in the form of main structural groups that can, easily be assembled and disassembled so as to afford great mobility to move from site to site. In addition, the process according to the present invention is able to produce machine-ready helical-seam pipes of high quality, as a consequence of the following features:
1. novel configuration of the strip preparation of the hot strip;
2. laser welding through multi-layer technique (layer-counterlayer technique);
3. integrated quality assurance comprised of
   photo-optical online process diagnostics,
   photo-optical online determination of the seam profile,
   ultrasonic inspection of the seam cross section,
   computer tomographic determination and evaluation of flaws inside the pipe;
4. online pipe diameter and pipe length measurements;
5. shorter plant design in modular construction.

The novel configuration of the strip preparation of the hot strip is based on the condition of providing a neatly shaped and smoothed butt joint (I-joint) of the edges with a welding gap equal "zero". This can be realized by:
   even leveling of the hot strip
      two-stage leveling in transverse direction via a two-high roll pair,
      leveling in longitudinal direction via a multi-roller leveling unit,
   four-stage process of the edge preparation for providing a straight strip with parallel, beveled edges (beveled butt joint) by means of
      rough-milling or shearing,
      fine-milling,
      brushing in edge-proximal area,
      smoothing.

After leveling and edge preparation, quality assurance of the end product is carried out by inspecting the hot strip through ultrasonic technique for flaws, without destruction, across the entire length and width. Subsequently, the hot strip with the prepared strip edges are brought together in helical shape through application of conventional guiding and control systems in such a manner that the edges converge gap free and few degrees before the 6 o'clock position. In this position, the slotted tube is welded on the inside through laser welding. Suitably, the edges are slight bent so that the edges can be brought together without offset and free of gaps. The offset-free convergence of the edges can be assisted by a particular rolling tool in the welding spot of the 6 o'clock position.

As no weld camber or only a very slight camber is encountered in the immediate area of the inner and outer welded seams, the strip edges should be bent accurately to prevent edge offset and to prevent roof formation in the area of the welded seam. This greatly assists in the realization of a cylindrical configuration of the pipe.

Laser welding through multi-layer technique may be executed by using a $CO_2$ laser as well as solid-stet laser or all laser types that have enough power for application in the manufacture of large pipes. According to the present invention, multi-layer laser welding positively affects the configuration of the weld camber inside the pipe as well as outside the pipe to thereby realize a good, destruction-free and inspectable surface contour of the welded seam.

Routing the inner and outer laser beams in relation to the welding gap is implemented by sensors. This requires, however, in contrast to submerged-arc welding process, a very precise guidance of the laser heads to move them centrally above the welding gap and thus to evenly reach both strip edges. In addition, the laser beam heads are so controlled as to be able to travel transversely to the welding gap as well as in vertical direction. Furthermore, the welding head can tilt by few degrees to align the laser beam in an optimum manner in relation to the welding gap.

The outer configuration of the welded seam is dependent on the use of welding wire as welding material and is impacted by the wire diameter and the wire feed speed. The welding wire may, optionally, be supplied to the inner or outer seams or both seams during welding operation. The used wire diameter is hereby far below conventional diameters common in submerged-arc welding. Precise wire feed to the center of the laser beam is crucial for the quality of the welded connection. This is also true for the supply of inert gas.

As a consequence of heat development, the sensors and the wire guidance are cooled and of robust construction to satisfy the demands of the manufacturing process.

In order to attain a complete and thorough welding across the entire cross section of the hot strip, the energy of the laser sources should be suited to one another in such a manner that the inner and outer welded seams overlap by at least about one millimeter.

According to another feature of the present invention, one of the laser beams is incident on the inner side of the slotted tube in 6 o'clock position immediately after the strip edges are brought together, and the other one of the laser beams is incident on the outer side of the slotted in 12 o'clock position upon the welded seam in 180° offset relationship to the inner laser beam.

Depending on the available laser energy, the welding speed can be adjusted in dependence in the wall thickness of slotted tube being welded and the required seam properties.

The integrated quality assurance involves complete ultrasonic inspection of the hot strip before welding, and monitoring the welding process itself by a photo-optical online process diagnostic system. Disturbances in the melt bath impact the configuration of the laser-induced plasma and temperature thereof. Detectors on the welding head continuously determine the intensity of the plasma arc of a particular zone of the light wave length in the welding spot and the temperature upon the welded seam. By continuously comparing these data in conjunction with defined data from a training process, unevenness during the welding process can be determined as one element of the process diagnostics.

The profile of the seam configuration may be determined photo-optically by laser line scanner and analyzed by an evaluation camera in relation to an ideal line. In this way, also external flaws of the welded seam can be detected. Detection of interior flaws of the welded seam can be implemented through conventional ultrasonic inspection.

By linking the data of the afore-described control system, reliable information can be gathered about the quality of the produced welded seam so that the need for further inspection processes employed heretofore can be eliminated.

Online pipe diameter and pipe length measurements involve the application of an online inspection device which continuously monitors the produced pipe diameter and signals in due time when the tolerance limits have been reached. The online pipe length measurement ascertains the produced pipe length and controls the cutter which runs concurrently to cut the continuous pipe strand into individual pipe sections. Integrated in the plant design in immediate conjunction with the outlet of the laser welding unit is a processing unit for the pipe ends for shaping the pipe ends into a configuration as desired by a customer.

As a consequence of the afore-described configuration of the welding process and quality assurance, the complexity of the plant design can be significantly lessened and, in fact, reduced to the actual laser welding device. Thus, the plant design satisfies current demands and allows great mobility for transfer from site to site.

According to another aspect of the present invention, an apparatus for making a welded large pipe from hot strip of steel includes a coiler to pay out a hot strip, a welding machine for providing a connecting welded seam of the strip, a two-stage two-high roll pair for leveling the hot strip in transverse direction, a multi-roller leveling unit for leveling the hot strip in longitudinal direction, an ultrasonic inspection unit for checking the hot strip, a first processing unit for preparing strip edges of the hot strip, a bending machine for bending the strip edges, a strip shaping unit to shape the hot strip into a slotted tube, a laser welding unit for welding the strip edges along an inner side and outer side of the tube to produce a pipe, a photo-optical process diagnostic system for analyzing the welding process, a measuring unit for inspecting a diameter of the welded pipe, a photo-optical seam detection system for an inner welded seam and an outer welded seam of the pipe, a computer tomographic inspection and evaluation unit for checking the welded pipe for flaws, and an ultrasonic inspection device for checking the welded seam.

The apparatus according to the invention can be constructed as a modular system comprised of main structural groups that can easily be assembled and disassembled and transferred to another site. Energy supply may be realized in a modular manner, if necessary, via mobile power generation unit. This modular concept may further include the actual manufacturing hall as weather protection, and lifting gears. Only the foundation plate will stay behind at the old site.

The method and apparatus for making large pipes, in particular helical-seam pipes, has many advantages as summarized hereinafter:

The application of a state-of-the art quality assurance enables supervision of the welding process for reliable operation and of the finished welded seam. The collected data can be logically linked with data relating to the destruction-free material inspection so that reliable information can be obtained about quality and the need for further inspection and control measures, as applied heretofore, can now be eliminated.

The novel multi-layer laser welding process enables the use of a much less liquid weld pool compared to submerged-arc welding, and the risk of encountering flaws as a result of turbulences and contaminations in the melt bath, during solidification, and a limitation of the possible welding speed through running of the weld pool, caused by the pipe curvature, can be eliminated. The laser energy can be fully exploited for the welding speed in dependence on the sheet metal thickness, regardless of the pipe diameter.

Decrease of the average flaw size as a result of the small seam volume to about one tenth of the seam volume known from submerged-arc welding.

The plant design can be made significantly shorter and is flexible and mobile as a result of the modular construction.

Possibility to produce a machine-ready endless pipe stand of high quality which can be directly laid by conventional pipe installation processes. The need for complex production of a pipe strand with single pipe sections welded together is hereby eliminated.

Possibility of a pipe production as a strand on a pipe-laying ship.

Production of a welded large pipe with better cylindrical inner and outer contours, whereby the inner and outer surfaces of the pipe are not interrupted or interfered with by a circumferential weld camber, as is the case in submerged-arc welding.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
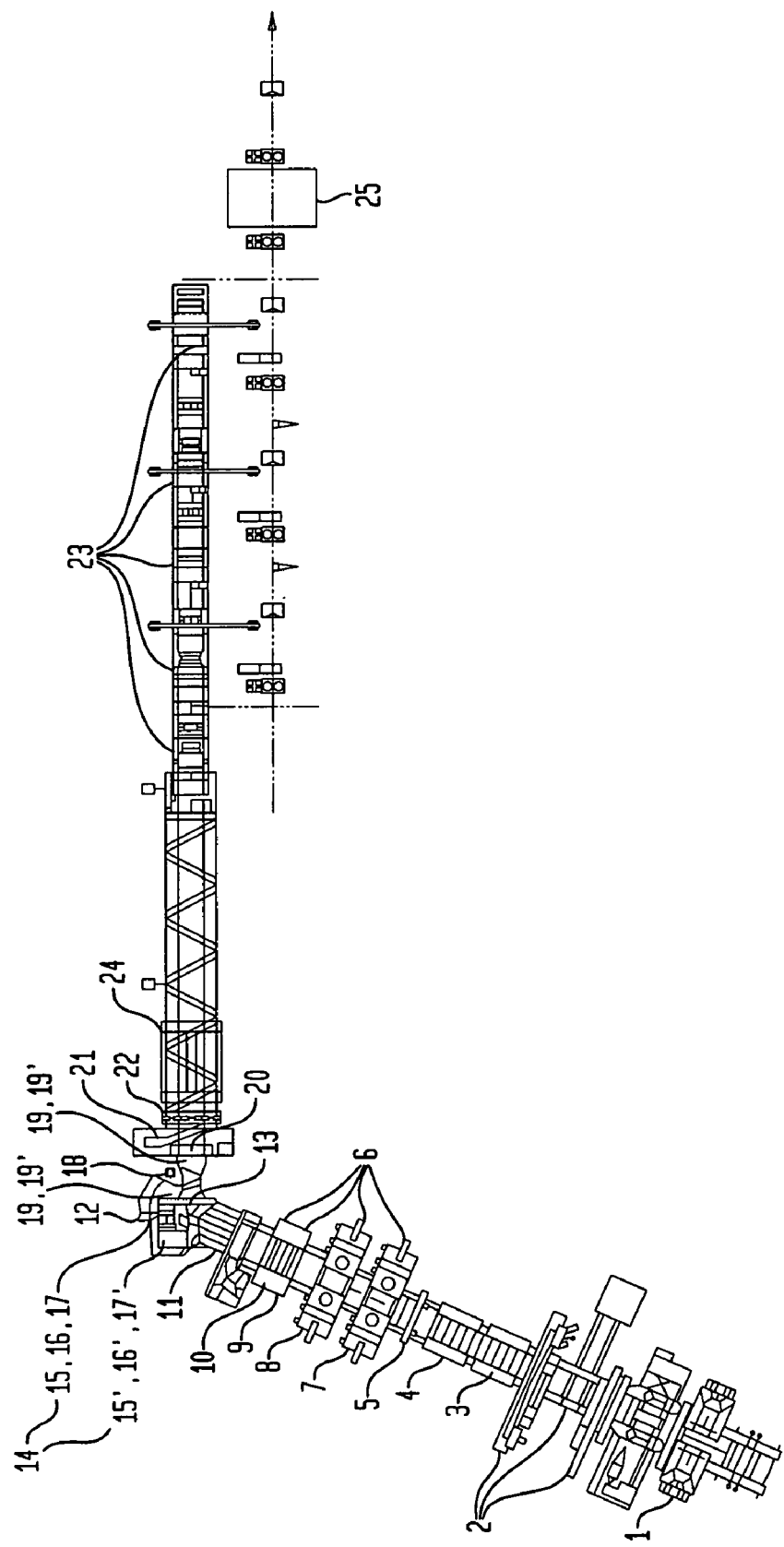
FIG. 1 is a schematic illustration of a layout of a plant design of an apparatus for making large pipes, in accordance with the present invention.

Throughout all the FIGS., same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a layout of a plant design of an apparatus for making a machine-ready large pipe, in accordance with the present invention. A hot strip wound to a coil upon a coiler 1 pays out from the coiler 1 and has a leading end which is advanced to a welding machine 2 for welding to the trailing end of a hot strip that is already located in the entry zone of the welding machine 2 to thereby make a strip connection seam. In this way, an endless strip is produced to thereby realize a substantially continuous welding process. Disposed downstream of the welding machine 2 is a structural assembly comprised of a two-stage two-high roll pair 3 for leveling the hot strip during passage in transverse direction for strip flatness. The hot strip then passes through a multi-roll leveling unit 4 for straightening the hot strip in longitudinal direction for flatness. The leveling unit 4 is constructed to stretch and upset the strip significantly above the yield point so as to significantly decrease stress and deformation in longitudinal and transverse directions of the strip.

Following the leveling unit 4 is an ultrasonic inspection device 5 to check the entire surface area of the hot strip and in particular to check strip edges to be welded, for discontinuities. The ultrasonic inspection device 5 is followed by a four-stage strip edge processing unit 6 for producing a plan-parallel strip in dependence on the sheet metal width. The processing unit 6 includes a roughing mill 7 for rough-rolling the strip edges As an alternative, the use of circular knives may be possible. After rough-rolling, the strip edges are finely rolled in a finishing mill 8, and flash encountered on the strip edges during milling is removed by a brush assembly 9 with revolving circular brushes.

Disposed downstream of the processing unit 6 is a smoothing machine 10 which includes hardened grooved pulleys pressed against the strip edges to thereby smooth the milled strip edges and optimize a sliding of the edges toward one other during later shaping into a slotted tube. Hereby, it is the objective that the joint between both strip edges has a zero gap without void to provide optimal conditions for the subsequent laser welding process. The sliding process can further be enhanced by beveling the strip edges in relation to the strip surface.

Following the smoothing machine 10 is a bending machine 11 by which the edges of the hot strip are pre-bent to minimize a roof formation in the area of the welded seam.

The subsequent shaping unit 12 includes a three-roller bending device with external support cage by which the strip is shaped in the form of a tube. The strip edges are hereby carried in 6 o'clock position by a vertically adjustable grooved weld support roller 13 by which an offset of the strip edges can be significantly influenced. The groove formed in the weld support roller 13 is set in relation to the inner welding spot in such a manner that welding deposit falling through the welding gap drops into this groove and is prevented from sticking to the surface of the support roller 13.

Welding of the thus shaped tube along the strip edges on the inside and the outside to produce a pipe is implemented by a laser welding unit 14 which includes a laser welding head 15 for the inner seam welding and a laser welding head 15' for the outer seam welding. Each of the welding heads 15, 15' can travel in three directions and is swingably mounted in relation to the longitudinal direction of the welded seam. The laser welding heads 15, 15' are constructed as cooled compact welding heads and include each a laser focusing device with securely attached seam tracking sensor 16, 16' as well as securely attached sensors 17, 17' for online process diagnostics and steadily maintaining the focused disposition as well as for the feed device for the welding wire.

The finished welded pipe is continuously surveyed by a diameter measuring device 18 which operates automatically in a contactless manner and includes a control unit. The measuring device 18 is further equipped with signal transmitters which output control signals, when certain limit values have been reached. The outer seam configuration of the inner seam and the outer seam is surveyed and analyzed by a photo-optical seam analyzer 19 situated downstream of the laser welding unit 14.

Disposed in the exit zone of the pipe welding machine is an online computer tomographic inspection unit 20 for optional check of the entire pipe for internal flaws in the actual base material (hot strip) and the welded seam and establishment of a commensurate inspection protocol. An ultrasonic inspection unit 21 examines subsequently the welded seam for longitudinal and transverse flaws.

Figure 2A:
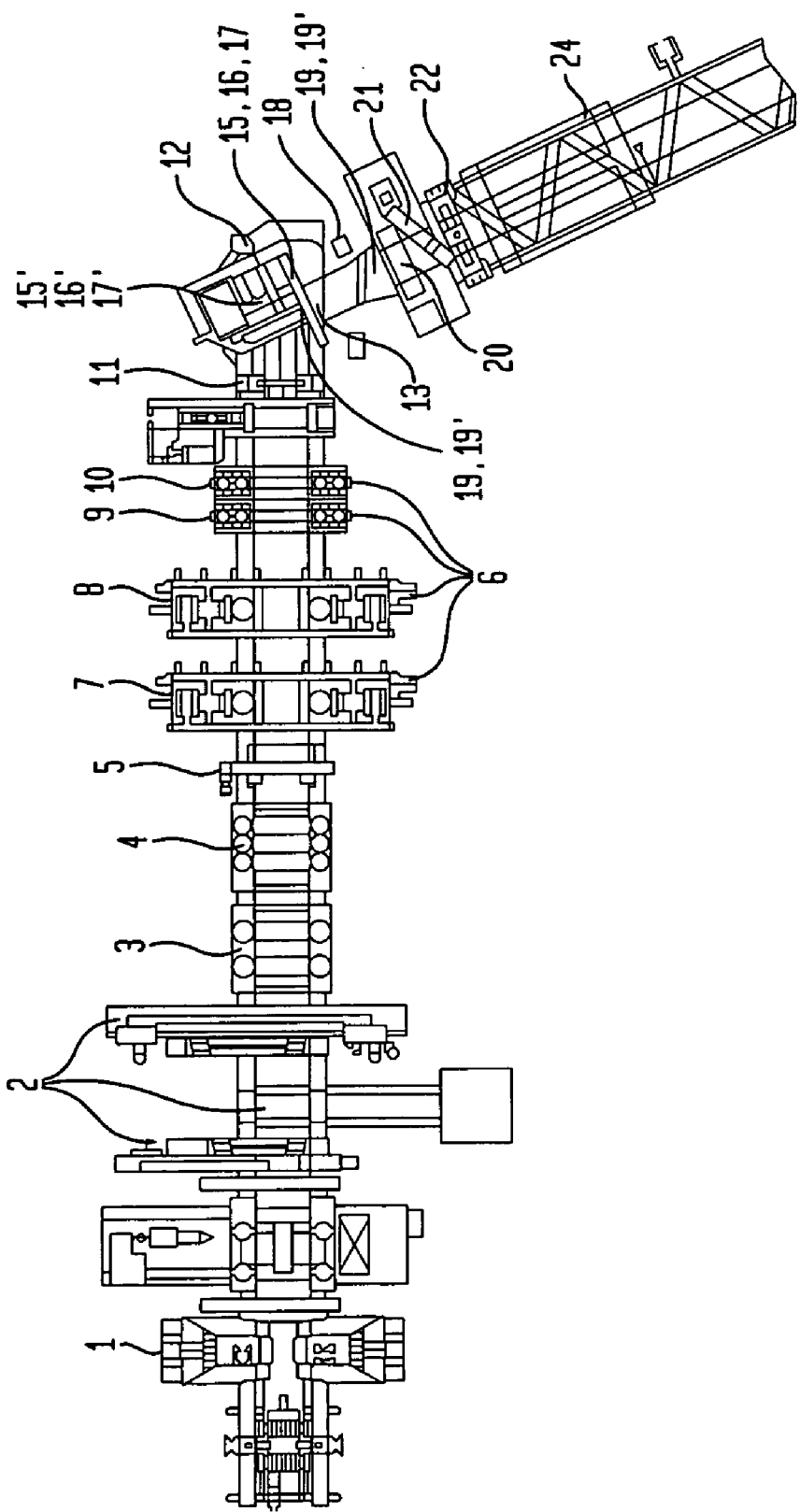
FIG. 2a is a detailed view, on an enlarged scale, of a portion of the apparatus.
Figure 2B:
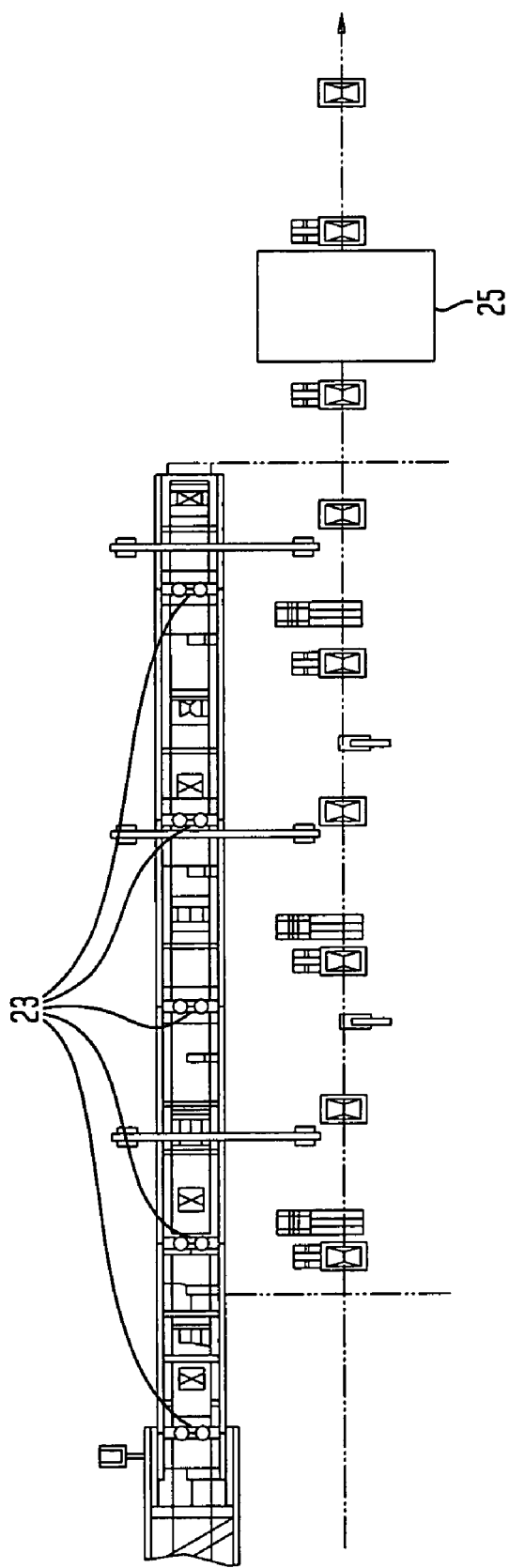
FIG. 2b is a detailed view, on an enlarged scale, of another portion of the apparatus.

FIGS. 2a and 2b show detailed views of the apparatus on an enlarged scale.

The outcome of the inspection derived from the inspection systems ultrasonic inspection of the base material with edge zone examination, online process diagnostics for the inside, tracking optical flaw recognition for the inside, online process diagnostics for the outside, tracking optical flaw recognition for the outside, diameter measuring device, computer tomographic quality control, ultrasonic inspection of the welded seam, are inputted in a central computer, compared and analyzed on the basis of existing inspection charts. All pipe sections controlled in this manner are labeled "useful" or "defective". When labeled "defective" the outer pipe surface is marked accordingly. Likewise, type and position of the flaw is automatically recorded in the inspection report.

The welded and inspected pipe strand is guided in a fixed stay 22 and carried by a vertically adjustable support block 23. A pipe cutter 24 with length measuring device cuts, optionally, the endless pipe strand into pipe sections of desired length. Examples of cutters include thermal cutters as well as mechanical cutters.

The severed pipe section is lowered and exits in longitudinal alignment or is discharged in transverse alignment. Immediately following is a processing unit 25 for final shaping of the pipe ends in accordance with a customer's specifications. Of course, cutting the pipe strand into single pipe sections may be omitted when the apparatus is located on an installation ship for continuous laying of the pipe strand.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a welded large pipe from hot strip of steel, comprising the steps of:
   a) unwinding a hot strip;
   b) connecting a leading end of the strip with a trailing end of a leader strip;
   c) two-stage leveling of the hot strip for strip flatness in transverse direction;
   d) leveling the hot strip for strip flatness in longitudinal direction;
   e) ultrasonic inspection of an entire surface of the hot strip including inspecting strip edges of the hot strip;
   f) four-stage preparation of the strip edges;
   g) bending the strip edges;
   h) shaping the hot strip into a slotted tube;
   i) welding the strip edges along the inside and outside of the slotted tube by laser to thereby form a pipe;
   j) online process diagnostic of the welding step;
   k) online measurement of a pipe diameter;
   l) online determination of a profile of the welded seam;
   m) computer tomographic determination and evaluation of flaws inside the pipe; and
   n) ultrasonic inspection of the welded seam.

2. The method of claim 1, wherein the pipe is a helical-seam pipe.

3. The method of claim 1, further comprising in succession of step n) the steps of inline separation of the pipe into single pipe sections, and final shaping of pipe ends.

4. The method of claim 3, wherein the step of inline separation of the pipe into single pipe sections is implemented by plasma cutting.

5. The method of claim 1, wherein the step f) includes the steps of rough-milling or shearing the strip edges, finish-milling the strip edges, brushing the strip edges, and smoothing the strip edges.

6. The method of claim 4, wherein the strip edges are beveled to a top surface of the strip.

7. The method of claim 1, wherein the step j) is implemented photo-optically.

8. The method of claim 1, wherein the step l) is implemented photo-optically.

9. The method of claim 1, wherein the step i) includes the application of two laser beams in such a manner as to realize an overlap of an outer welded seam and an inner welded seam by at least one millimeter.

10. The method of claim 9, wherein the laser beams incident on a pipe inner side and a pipe outer side track during step i) the strip edges which form a welding gap.

11. The method of claim 9, wherein one of the laser beams is incident on the inner side of the pipe in 6 o'clock position upon the welded seam immediately after the strip edges are brought together during step h).

12. The method of claim 11, wherein the other one of the laser beams is incident on the outer side of the pipe in 12 o'clock position upon the welded seam in 180° offset relationship to the one laser beam which is incident on the inner side of the pipe.

13. The method of claim 10, further comprising the step of adding welding material to the welding gap during step i).

14. Apparatus for making a large welded pipe from hot strip of steel, comprising:
   a coiler to pay out a hot strip;
   a welding machine for providing a connecting welded seam of the strip;
   a two-stage two-high roll pair for leveling the hot strip in transverse direction;
   a multi-roller leveling unit for leveling the hot strip in longitudinal direction;
   an ultrasonic inspection unit for checking the hot strip;
   a first processing unit for preparing strip edges of the hot strip;
   a bending machine for bending the strip edges;
   a strip shaping unit to shape the hot strip into a slotted tube;
   a laser welding unit for welding the strip edges along an inner side and outer side of the tube to provide a pipe;
   a photo-optical process diagnostic system for analyzing the welding process;
   a measuring unit for inspecting a diameter of the welded pipe;
   a photo-optical seam detection system for an inner welded seam and an outer welded seam of the pipe;
   a computer tomographic inspection and evaluation unit for checking the welded pipe for flaws; and
   an ultrasonic inspection device for checking the welded seams.

15. The apparatus of claim 14, wherein the pipe is a helical-seam pipe.

16. The apparatus of claim 14, wherein the laser welding unit is a multi-layer laser welding unit.

17. The apparatus of claim 14, further comprising downstream of the ultrasonic inspection device a pipe cutter and a second processing unit for final preparation of pipe ends.

18. The apparatus of claim 17, wherein the pipe cutter is a plasma cutting machine.

19. The apparatus of claim 14 constructed as a modular system comprised of main structural assemblies that can easily be assembled and disassembled.

20. The apparatus of claim 17, wherein the second processing unit includes a roughing mill or shearing blades for the strip edges, a finishing mill for the strip edges, a brush assembly for the strip edges, and a smoothing machine for the strip edges.

21. The apparatus of claim 14, wherein the laser welding unit includes a laser head for realizing the inner seam, and a laser head for realizing the outer seam.

22. The apparatus of claim 21, wherein the laser welding heads are constructed for movement in three-dimensions and swingably mounted in longitudinal welded seam direction.

23. The apparatus of claim 21, wherein the laser welding unit has integrated therein sensors for tracking a laser beam in relation to the strip edges being welded.

24. The apparatus of claim 14, wherein the photo-optical seam detection system includes a laser line scanner and an evaluation camera for the inner seam and a laser line scanner and an evaluation camera for the outer seam.

* * * * *